United States Patent [19]

Okamoto et al.

[11] Patent Number: 4,931,500
[45] Date of Patent: * Jun. 5, 1990

[54] HYDROLYZED ETHYLENE-VINYL ACETATE COPOLYMER

[75] Inventors: Shinji Okamoto, Kurashiki; Masaaki Minakawa, Hirakata; Youiti Neki, Kurashiki; Masasi Nakagire, Kurashiki, all of Japan

[73] Assignee: Nippon Gohsei Kagaku Kogyo Kabushiki Kaisha, Osaka, Japan

[*] Notice: The portion of the term of this patent subsequent to Aug. 15, 2006 has been disclaimed.

[21] Appl. No.: 234,109

[22] Filed: Aug. 19, 1988

[30] Foreign Application Priority Data

Oct. 2, 1987 [JP] Japan ................. 62-250362

[51] Int. Cl.$^5$ ............................. C08F 16/06
[52] U.S. Cl. ......................... 525/60; 525/61; 525/62
[58] Field of Search ............... 525/60, 61, 62

[56] References Cited

U.S. PATENT DOCUMENTS

| 3,560,461 | 2/1971 | Yonezu et al. | 525/60 X |
| 3,890,267 | 6/1975 | Fukushima et al. | 524/417 X |
| 4,041,223 | 8/1977 | Amemiya et al. | 525/60 X |
| 4,367,305 | 1/1983 | Satoh et al. | 525/60 X |
| 4,611,029 | 9/1986 | Takahashi | 525/60 X |
| 4,719,259 | 1/1988 | Jenkins | 525/60 |

Primary Examiner—Joseph L. Schofer
Assistant Examiner—J. M. Reddick
Attorney, Agent, or Firm—Armstrong, Nikaido, Marmelstein, Kubovcik & Murray

[57] ABSTRACT

A hydrolyzed ethylene-vinyl acetate copolymer having an ethylene content of 20 to 60% by mole and a defree of hydrolysis in the vinyl acetate component of at least 95% by mole, having an ash content of not more than 20 ppm and an alkali metal content of not more than 5 ppm, and having a ratio of the melt viscosity at 220° C. after maintaining the copolymer at 220° C. for 60 minutes to the melt viscosity at 220° C. after maintaining the copolymer at 220° C. for 5 minutes of 1.0 to 1.5. The hydrolyzed copolymer of the invention can give the films whose gas impermeability is not lowered even at high humidity, and is applicable to long-run molding.

3 Claims, No Drawings

HYDROLYZED ETHYLENE-VINYL ACETATE COPOLYMER

BACKGROUND OF THE INVENTION

The present invention relates to a hydrolyzed ethylene-vinyl acetate copolymer, and more particularly to a hydrolyzed ethylene-vinyl acetate copolymer having an improved moisture resistance, particularly an excellent gas impermeability even under high humidity, and capable of continuing melt-molding for a long time (this property being hereinafter referred to as long-run moldability).

Hydrolyzed ethylene-vinyl acetate copolymers are excellent in oxygen impermeability, a mechanical strength, and the like, so they are widely used in various uses such as films, sheets, containers and fibers. However, the hydrolyzed copolymers have defects that the physical properties such as the flexibility of the molded articles therefrom vary remarkably due to change of humidity and temperature of the outside, and, particularly, the gas impermeability is lowered under high humidity, since the hydrolyzed copolymers have high moisture absorption.

Also, when the hydrolyzed copolymers are continuously melt-molded for a long time, there is a case that the long-run moldability is poor, such that gels are formed in the melted hydrolyzed copolymer, the colored deteriorated hydrolyzed copolymer is accumulated at an inside of a molding machine to lower the efficiency in molding, and the obtained molded articles are deteriorated in the quality.

In order to improve the lowering of the gas impermeability under high humidity, it has been proposed, for instance, (1) to laminate a moisture resistant resin such as a polyolefin on a film or sheet of the hydrolyzed ethylene-vinyl acetate copolymer to prevent permeation of water-vapor from the outside, (2) to introduce crosslinkable groups such as silyl group into the structure of the hydrolyzed ethylene-vinyl acetate copolymer to impart moisture resistance to the hydrolyzed copolymer, or the like. On the other hand, in order to improve the long-run moldability of the hydrolyzed copolymer, it has been adopted to admix a lubricant with the copolymer on melt-molding, or the like.

In the above-mentioned improvement of the gas impermeability, however, in the former (1) has defects that laminating operation is required, and even if laminating the moisture resistant resin on the film or sheet of the hydrolyzed copolymer, it is difficult to prevent permeation of water-vapor from the edges of the film or sheet. Also, the latter (2) has defects that crosslinking or gelation of the hydrolyzed copolymer is caused easily upon the preparation or molding of the hydrolyzed copolymer, and the moldability is lowered. On the other hand, in the improvement of the long-run moldability, the properties of the hydrolyzed ethylene-vinyl acetate copolymer, for example, the adhesion to other resins on production of its multi-layer laminates, are lowered since the copolymer is admixed with the lubricant.

An object of the present invention is to provide a hydrolyzed ethylene-vinyl acetate copolymer having improved moisture resistance and long-run moldability without the above-mentioned defects.

This and other objects of the present invention will become apparent from the description hereafter.

SUMMARY OF THE INVENTION

In accordance with the present invention, there is provided a hydrolyzed ethylene-vinyl acetate copolymer having an ethylene content of 20 to 60% by mole and a degree of hydrolysis in the vinyl acetate component of at least 95% by mole, having an ash content of not more than 20 ppm and an alkali metal content of not more than 5 ppm, and having a ratio of the melt viscosity at 220° C. after maintaining the copolymer at 220° C. for 60 minutes to the melt viscosity at 220° C. after maintaining the copolymer at 220° C. for 5 minutes of from 1.0 to 1.5.

DETAILED DESCRIPTION

The feature of the present invention is that the ash content in the hydrolyzed ethylene-vinyl acetate copolymer is not more than 20 ppm and the alkali metal content in the hydrolyzed copolymer is not more than 5 ppm, and further, the hydrolyzed copolymer has the ratio of the melt viscosity at 220° C. after maintaining the copolymer at 220° C. for 60 minutes ($\eta_{60}$) to the melt viscosity at 220° C. after maintaining the copolymer at 220° C. for 5 minutes ($\eta_5$) (the ratio of $\eta_{60}$ to $\eta_5$ being hereinafter referred to as "$\eta_{60}/\eta_5$") of 1.0 to 1.5.

That is, usually, the hydrolyzed ethylene-vinyl acetate copolymer is prepared by hydrolyzing an ethylene-vinyl acetate copolymer with an alkaline catalyst. After hydrolysis reaction, polyvalent metal salts contained in industrial water or reagents as impurities and alkali metal hydroxides used as a hydrolysis catalyst remain in the reaction system as an acetate of alkali metal, and the alkali metal acetate is contained in the hydrolyzed copolymer precipitated from the hydrolyzing solution. In the present invention, the moisture resistance and the long-run moldability of the hydrolyzed copolymer can be improved by removing the metal salts and the acids used in a post-treatment from the hydrolyzed copolymer as much as possible. Moreover, the electric property, the color and the heat resistance can be improved by making the amount of the remaining metal salt small.

The term "ash" used herein means a residue obtained by placing the dried hydrolyzed ethylene-vinyl acetate copolymer on a platinum evaporating dish, carbonizing it by using a heater and a gas burner, placing the carbonized hydrolyzed copolymer in an electric furnace having a temperature of 400° C., gradually elevating the temperature of the furnace to 700° C., completely laying the carbonized copolymer in ashes by heating at 700° C. for 3 hours, allowing the resulting ash of copolymer to cool for 5 minutes after taking out from the furnace, and allowing it to stand for 25 minutes in a desiccator. The amount of the thus obtained ashes are accurately determined and it shows as an ash content.

In the present invention, it is necessary that the ash content is not more than 20 ppm, and it is preferable that the ash content is not more than 10 ppm. When the ash content is more than 20 ppm, the properties of the hydrolyzed copolymer vary remarkably depending on the change of humidity. Generally, the hydolyzed copolymer of the invention has the ash content of 1 to 20 ppm.

In the present invention, it is necessary that the alkali metal content is not more than 5 ppm, and it is preferable that the alkali metal content is not more than 3 ppm. When the alkali metal content is more than 5 ppm, in case of blending the hydrolyzed copolymer with other materials or adhering the copolymer to other materials, the hydrolyzed copolymer deteriorates the other materials. Generally, the hydrolyzed copolymer of the invention has the alkali metal content of 0.5 to 5 ppm.

The alkali metal content is determined according to atomic absorption analysis of an aqueous hydrochloric acid solution of the ashes, the solution being obtained by dissolving the ashes obtained in the same manner as in the determination of the ash content in an aqueous solution of hydrochloric acid with heating.

Further in the present invention, it is necessary that the copolymer has $\eta_{60}/\eta_5$ of from 1.0 to 1.5. When $\eta_{60}/\eta_5$ is less than 1.0, that is, the melt viscosity of the copolymer is remarkably decreased with the passage of time, there frequently occur various problems such that the copolymer is colored to from yellow to brown and is foamed by gas generated by the decomposition of the copolymer during the long-run molding. On the other hand, when $\eta_{60}/\eta_5$ is more than 1.5, that is, the melt viscosity of the copolymer is remarkably increased with the passage of time, there are problems such that the amount of discharge lowers and gel is formed on the long-run molding, accordingly, such a copolymer cannot be used in practical use.

The hydrolyzed copolymer of the present invention has $\eta_{60}/\eta_5$ of 1.0 to 1.5, and such a copolymer is stable in the melt viscosity for a long time (about 7 days or longer) within the range of usual melt-molding temperature of the hydrolyzed ethylene-vinyl acetate copolymer, i.e., from 210° to 230° C. Accordingly, the copolymer of the invention has the improved long-run moldability, that is, the copolymer can be applied to long-run molding, and is capable of providing molded articles having excellent properties in stable molding efficiency.

In the invention, the melt viscosity is measured by using a Koka shiki flow tester made by Kabushiki Kaisha Simazu Seisakusho under conditions of 1 mm in nozzle diameter, 10 mm in nozzle length and 10 kg/cm² in load. Under the above conditions, the viscosity (poise) is measured at the temperature of 220° C. with respect to the copolymer residing in the cylinder for 5 minutes ($\eta_5$) and the copolymer residing in the cylinder for 60 minutes ($\eta_{60}$).

Processes for preparing the hydrolyzed ethylene-vinyl acetate copolymer of the invention are not limited since the properties of the copolymer vary according to polymerization methods, hydrolysis methods, degrees of polymerization, degrees of hydrolysis, posttreating method of the hydrolyzed copolymer, drying conditions, additives, and the like. Usually, in the present invention, the powder, particles or pellets (hereinafter referred to as "the powder and the like") of the hydrolyzed ethylene-vinyl acetate copolymer prepared by hydrolyzing the ethylene-vinyl acetate copolymer are thoroughly washed with an aqueous solution of an acid, preferably a weak acid, to remove the salts which cause to generation of the ashes and the alkali metals from the hydrolyzed copolymer. Further, the powder and the like is washed with water to remove the acid adhered to the powder and the like. Then, the powder and the like is dried.

In such a case, water to be used in washing of the copolymer must be, of course, water containing little a metal ion, for example, deionized water.

Examples of the acids are, for instance, acetic acid, propionic acid, glycollic acid, lactic acid, adipic acid, azelaic acid, glutaric acid, succinic acid, benzoic acid, isophthalic acid, terephthalic acid, and the like. An acid having a pKa (25° C.) of not less than 3.5 is preferably used.

After completing the above mentioned weak acid treatment, the hydrolyzed copolymer is further treated with an aqueous solution of a strong acid, the aqueous solution of strong acid being diluter than the aqueous solution of weak acid, after or before washing with water. The washing with the dilute aqueous solution of the strong acid is preferred, since it is possible to efficiently remove the alkali metal. Examples of the strong acids are, for instance, an organic acid having a pKa (25° C.) of not more than 2.5 such as oxalic acid or maleic acid, an inorganic acid such as phosphoric acid, sulfuric acid, nitric acid or hydrochloric acid, and the like.

In both cases that the copolymer is treated with the aqueous solution of weak acid or the dilute aqueous solution of strong acid, it is necessary to thoroughly remove the acid adhered to the copolymer by washing the copolymer with water containing little a metal ion before drying the copolymer. $\eta_{60}/\eta_5$ can be properly adjusted to from 1.0 to 1.5 by this washing with water containing little metal ion.

The thus obtained hydrolyzed copolymer must finally satisfy that the acids are not remained therein as well as the ash content and the alkali metal content is controlled as little as possible.

The acid content in the hydrolyzed copolymer is determined as follows: The hydrolyzed ethylene-vinyl acetate copolymer pellets are subjected to Soxhlet extraction in an amount of 30 g with 150 ml of deionized water for 3 hours. With respect to the obtained extract (extracted water), the content of free acids existing in the copolymer is determined by means of neutralization titration with sodium hydroxide using Neutral Red as an indicator.

In the present invention, the content of free acids is not more than 0.3 $\mu$eq/l, preferably not more than 0.15 $\mu$eg/l. When the content of free acids is more than 0.3 $\mu$eq/l, the viscosity of the hydrolyzed copolymer greatly varies during the melt-molding, and the moldability of the copolymer is remarkably lowered.

The free acid content is also indicated according to an another method in addition to the abovementioned determination method. That is, the pH of the above-mentioned extract is measured, and the difference between the pH of the extract and the pH of the deionized water used for extraction ($\Delta$pH) is found. $\Delta$pH is a parameter of the free acid content.

The hydrolyzed ethylene-vinyl acetate copolymer of the present invention has an ethylene content of 20 to 60% by mole, preferably from 25 to 55% by mole, and has a degree of hydrolysis in the vinyl acetate component of at least 95% by mole. When the ethylene content is below 20% by mole, the oxygen impermeability is lowered at high humidity. On the other hand, when the ethylene content is over 60% by mole, the properties such as the oxygen impermeability and the printability are lowered. When the degree of hydrolysis is below 95% by mole, the oxygen impermeability and the moisture resistance are lowered.

The hydrolyzed copolymer of the invention may include a small amount of comonomers, e.g. $\alpha$-olefins such as propylene, iso-butene, $\alpha$-octene, $\alpha$-dodecene and $\alpha$-octadecene; an unsaturated carboxylic acids, their salts, partial or complete alkyl esters, nitriles, amides and anhydrides; and unsaturated sulfonic acids and their salts.

Thus, the desired hydrolyzed ethylene-vinyl acetate copolymer can be prepared, and is useful for various uses such as molded articles, adhesives and coatings. Particularly, the hydrolyzed copolymer is widely used as molded articles, and is formed into molded articles having any shape such as pellets, films, sheets, containers, fibers, rods or tubes by melt molding. Also, the pulverized articles (in case of recycling of used articles) or pellets may be further subjected to melt molding. The obtained films or sheets can be uniaxially or biaxially stretched. As a molding method, an extrusion such as T-die extrusion, tubular film process, blow molding, melt spinning or profile extrusion and injection molding are mainly applicable to molding of the hydrolyzed copolymer. The melt molding temperature is often selected from the range of 170° C. to 270° C. The above-mentioned injection molding includes two-color molding and injection blow molding, and the obtained molded articles have high dimensional precision.

Also, there can be molded the mixture of two or more kinds of the hydrolyzed ethylene-vinyl acetate copolymers different from each other in an ethylene content or a degree of hydrolysis. When the hydrolyzed copolymer is subjected to melt-molding, usual additives can be admixed in a suitable amount to the hydrolyzed copolymer. Examples of the additives are, for instance, plasticizers such as polyhydric alcohols, stabilizers, surfactants, cross-linkable substances such as epoxy compounds, polyvalent metal salts and organic or inorganic polybasic acids and their salts, fillers, coloring agents, fibers used as reinforcement (glass fibers, carbon fibers, and the like), and the like. Also, other thermoplastic resins may be admixed in a suitable amount to the hydrolyzed copolymer. Examples of the other thermoplastic resins are, for instance, polyolefins such as polyethylene, polypropylene, ethylene-propylene copolymers, ethylene-propylene-diene terpolymers, copolymers of ethylene and an $\alpha$-olefin having not less than 4 carbon atoms, ethylene-vinyl acetate copolymers, ethylene-acrylic acid ester copolymers, ionomers, polybutene and polypentene; modified polyolefins prepared by graft-modification of the above-mentioned polyolefins with unsaturated carboxylic acids or derivatives thereof; polyamide, polyvinyl chloride, polyvinylidene chloride, polyester, polystyrene, polyacrylonitrile, polyurethane, polyacetal, polycarbonate, polyvinyl alcohol resin capable of meltmolding, and the like.

When the extrusion is adopted as the melt kneading method, not only the extrusion in which the hydrolyzed ethylene-vinyl acetate copolymer is employed alone can be carried out but also there can be carried out the coextrusion in which the hydrolyzed copolymer and other thermoplastic resins are melt kneaded separately and they are extruded so as to join at the inside or the outside of a die or a combining adaptor. Also, the composition containing the hydrolyzed copolymer of the invention can be extrusion-coated on a base material such as plastic film, metal foil or paper. As the other thermoplastic resin used in the coextrusion, the above-mentioned thermoplastic resins can be employed. Examples of the base material in the extrusion-coating are, for instance, films, sheets or laminated films of cellophane, polypropylene, polyamide, polyester, polyacetal, polycarbonate, polystyrene or polyvinyl chloride (they may be uniaxially or biaxially stretched, or their both or either sides are coated with a polyvinylidene chloride resin, and the like), and the like. The thus obtained films, sheets and containers are useful as wrapping or packaging materials for foods, medical supplies, industrial chemical reagents, agricultural chemicals, and the like.

The hydrolyzed copolymer of the present invention has $\eta_{60}/\eta_5$ of 1.0 to 1.5 as well as the decreased ash content and alkali metal content. Accordingly, the copolymer has excellent long-run moldability and can give molded articles such as films whose gas impermeability is not lowered even under high humidity.

The present invention is more specifically described and explained by means of the following Examples in which all per cents and parts are by weight unless otherwise noted. It is to be understood that the present invention is not limited to the Examples, and various changes and modifications may be made in the invention without departing from the sperit and scope thereof.

In all Examples 1–5 and Comparative Examples 1–3, the used water was deionized water.

EXAMPLE 1

A pressure reactor was charged with 1,000 parts of a 40% methanol solution of ethylene-vinyl acetate copolymer having an ethylene content of 40% by mole and heated to 110° C. with stirring. Then, the hydrolysis reaction was carried out for 2.5 hours by continuously adding 40 parts of a 6% methanol solution of sodium hydroxide and 2,500 parts of methanol to the pressure reactor with removing methyl acetate produced as a byproduct and excess methanol from the reaction system to give a hydrolyzed ethylene-vinyl acetate copolymer having a degree of hydrolysis in vinyl acetate component of 99.0% by mole.

After completing the hydrolysis reaction, the pressure reactor was charged with 450 parts of a mixture of methanol and water (methanol : water = 7:3) with distilling away excess methanol to give a methanol solution containing water (water : methanol = 3:7) having a resin content of 39%.

The obtained solution of the hydrolyzed ethylene-vinyl acetate copolymer in the mixture of methanol and water having a temperature of 50° C. was extruded through a nozzle (hole diameter : 4 mm) at a rate of 1.5 liters/hour into a coagulating bath (width : 100 mm, length : 4,000 mm, height : 100 mm) having a mixture of water and methanol (water : methanol = 9:1) maintained at a temperature of 5° C. in the form of a strand. After completing the coagulation, the strand was passed through a wind-up roller (line speed : 2 m/minute) equipped at the end portion of the coagulating bath, and was cut by a cutter to prepare white porous pellets having a diameter of 4 mm and a length of 4 mm. The hydrolyzed ethylene-vinyl acetate copolymer had an ash content of 7,400 ppm and a sodium metal content of 4,800 ppm.

Then, 100 parts of the obtained pellets were washed by dipping in 300 parts of a 0.3% aqueous solution of acetic acid and stirring at 30° C. for 1 hour. After repeating the above washing twice, the slurry was filtered off. The obtained pellets were washed by mixing with 300 parts of water to give a slurry and stirring the slurry at 30° C. for 1 hour. After repeating the washing three times, the slurry was filtered off and dried.

Thus obtained hydrolzed ethylene-vinyl acetate copolymer had a degree of hydrolysis of 99.0% by mole, an ash content of 6 ppm and a sodium metal content of 2.7 ppm. Also, the hydrolyzed copolymer had a $\eta_5$ of 6,500 poise, a $\eta_{60}$ of 8,500 poise and a $\eta_{60}/\eta_5$ of 1.3. Further, the content of free acid (acetic acid) in the copolymer was not more than 0.1 $\mu$eq/ and $\Delta$pH was not more than 0.1. The hydrolyzed copolymer was extruded under the following conditions to give a film having a thickness of 20μ.

Extruder: Extruder having a diameter of 40 mm, L/D=28
Screw: Full flighted screw
Compression ratio: 4.0
Screen pack: 50/120/50(mesh)
Die: Manifold die
Die width: 450 mm
Lip width: 0.2 mm
Chill roll: Water cooling metal roll
Temperature of Cylinder:
  $C_1 = 180°$ C.
  $C_2 = 200°$ C.
  $C_3 = 220°$ C.
  $C_4 = 230°$ C.
  $C_5 = 230°$ C.
Temperature of head: 230° C.
Temperature of die: 220° C.
Screw speed: 30 rpm
Wind-up speed: 20 m/min.

Oxygen permeability (cc.cm/cm$^2$.sec.cmHg) of the obtained film was measured according to American Society for Testing Materials (ASTM) D 1434 58. Also, the number of fish eyes (diameter: at least 0.1 mm) per area of 100 cm$^2$ of the film was counted.

The hydrolyzed copolymer as obtained above was pelletized by using an extruder at 230° C. The pelletization was repeated three times. A film was prepared in the same manner as above from the obtained pellets given a heat history for a long time. The number of the fish eyes in the film was counted in the same manner as above.

Further, in order to examine the long-run moldability of the hydrolyzed copolymer, the melt-molding was continued under the same conditions as above over 7 days. Then, the state of the extruder, and the obtained film were observed. The results are shown in Table 1. The ash content and sodium metal content were determined as follows:

[Ash content]

There is exactly determined about 80 g of a dried sample of the hydrolyzed copolymer, and about 10 g of the sample is placed on a platinum evaporating dish reached to constant weight and carbonized by using an electric heater. After carbonizing 10 g of the sample, 10 g of the another sample is placed on the evaporating dish and carbonized in the same manner as above. The above procedure is repeated until all of the sample is carbonized. At last the sample on the dish is burned by heating with a gas burner until not giving out smoke. The evaporating dish is put into an electric furnace having a temperature of about 400° C., covered nearly all the dish with a cover of a porcelain crucible and the temperature of the furnace is gradually risen to 700° C. After completing the ashing by maintaining the temperature at 700° C. for 3 hours, the dish is taken out from the electric furnace. The dish is allowed to cool for 5 minutes and is allowed to stand in a desiccator for 25 minutes. The obtained ashes are exactly determined.

[Sodium metal content]

There is exactly determined about 10 g of a dried sample of the hydrolyzed copolymer and is charged in a platinum crucible. The ashing is conducted in the same manner as above. The platinum crucible is charged with 2 ml of guaranteed hydrochloric acid (which is prescribed in Japanese Industrial Standard) and 3 ml of pure water and the ashes are dissolved by heating with an electric heater. The obtained solution is poured into a 50 ml messflask with pure water and pure water is added to the flask to its markded line to prepare a sample for atomic absorption analysis.

A standard solution for atomic absorption analysis (sodium metal: 1 ppm, hydrochloric acid: about 0.5 N) is separately prepared. Sodium metal content is determined by measurement of an absorbance ratio of an absorbance of sample solution to an absorbance of standard solution. Measuring conditions are as follows:

Apparatus: Hitachi 180-30 atomic absorption/flame spectrophotometer commercially available from Hitachi, Ltd..
Wave length: 589.0 nm
Flame: acetylene-air EXAMPLES 2 to 4 AND COMPARATIVE EXAMPLES 1 to 3

The procedure of Example 1 was repeated except that the hydrolyzed ethylene-vinyl acetate copolymer shown in Table 1 was used to give a film. With respect to the obtained film, oxygen permeability, the number of fish eyes and long-run moldability were measured in the same manner as in Example 1. The results are shown in Table 1.

EXAMPLE 5

A film was prepared in the same manner as in Example 1 except that the pellets of the hydrolyzed ethylene-vinyl acetate copolymer were further washed by dipping in 230 parts of a 0.003% aqueous solution of phosphoric acid, and stirring at 30° C. for 1 hour before washing the pellets with water. With respect to the obtained film, oxygen permeability, the number of fish eyes and long-run moldability were measured in the same manner as in Example 1. The results are shown in Table 1.

TABLE 1

| | Hydrolyzed ethylene-vinyl acetate copolymer | | | | | | |
| --- | --- | --- | --- | --- | --- | --- | --- |
| | Ethylene content (% by mole) | Degree of hydrolysis (% by mole) | Ash content (ppm) | Sodium metal content (ppm) | Ratio of melt viscosity ($\mu_{60}/\mu_5$) | Free acid content (μeg/l) | ΔpH |
| Ex. 1 | 40 | 99.0 | 6 | 2.7 | 1.3 | not more than 0.1 | not more than 0.1 |
| Ex. 2 | 29.5 | 99.5 | 6 | 2.5 | 1.2 | not more than 0.1 | not more than 0.1 |
| Ex. 3 | 29.5 | 99.5 | 10 | 3.0 | 1.2 | not more than 0.1 | not more than 0.1 |
| Ex. 4 | 40 | 99.5 | 10 | 4.5 | 1.4 | 0.2 | 0.1 |
| Ex. 5 | 40 | 99.0 | 10 | 1.4 | 1.3 | not more than 0.1 | not more than 0.1 |
| Com. | 40 | 99.0 | 30 | 10 | 1.5 | 0.2 | 0.1 |

TABLE 1-continued

| | Hydrolyzed ethylene-vinyl acetate copolymer | | | | | | |
|---|---|---|---|---|---|---|---|
| Ex. 1 | | | | | | | |
| Com. Ex. 2 | 40 | 99.0 | 6 | 2.7 | 1.8 | 0.7 | 2.0 |
| Com. Ex. 3 | 40 | 99.0 | 2.0 | 2.7 | 0.6 | 0.3 | 0.1 |

| | Oxygen permeability (cc · cm/cm$^2$ · sec · cm Hg) | | | The number of fish eyes | | Long-run moldability (7 days) |
|---|---|---|---|---|---|---|
| | 0% RH (20° C.) $\times 10^{-14}$ | 80% RH (20° C.) $\times 10^{-14}$ | 95% RH (20° C.) $\times 10^{-14}$ | After pelletizing one time | After pelletizing three times | |
| Ex. 1 | 4.0 | 5.6 | 6.2 | 1 to 2 | 3 to 4 | Nothing abnormal |
| Ex. 2 | 0.9 | 1.9 | 2.2 | 1 to 2 | 3 to 4 | " |
| Ex. 3 | 0.9 | 2.3 | 3.3 | 1 to 2 | 3 to 4 | " |
| Ex. 4 | 4.0 | 6.7 | 9.3 | 2 to 3 | 5 to 10 | " |
| Ex. 5 | 4.0 | 5.1 | 5.8 | 1 to 2 | 3 to 4 | " |
| Com. Ex. 1 | 4.0 | 8.3 | 24.1 | 10 to 15 | 30 to 40 | " |
| Com. Ex. 2 | 4.0 | 8.0 | 21.5 | 20 to 25 | 50 to 80 | After 10 hours, the resin pressure in the extruder increased and the screen was blocked with the resin. |
| Com. Ex. 3 | 4.5 | 10.2 | 38.5 | 5 to 10 | 15 to 30 | After 5 hours, bubbles occurred frequently in the film and the film was colored. |

As mentioned above, the film obtained from the hydrolyzed copolymer of the present invention has excellent oxygen impermeability even under high humidity, and also the hydrolyzed copolymer can be applied to longrun molding.

In addition to the ingredients used in the Examples, other ingredients can be used in the Examples as set forth in the specification to obtain substantially the same results.

What we claim is:

1. A hydrolyzed ethylene-vinyl acetate copolymer having an ethylene content of 20 to 60% by mole and a degree of hydrolysis in the vinyl acetate component of at least 95% by mole, having an ash content of not more than 20 ppm, an alkali metal content of not more than 5 ppm, and a free acid content of not more than 0.3 $\mu$eq/l, and having a ratio of the melt viscosity at 220° C. after maintaining said copolymer at 220° C. for 60 minutes to the melt viscosity at 220° C. after maintaining said copolymer at 220° C. for 5 minute at 1.0 to 1.5.

2. The copolymer of claim 1, wherein said ash content is not more than 10 ppm.

3. The copolymer of claim 1, wherein said alkali metal content is not more than 3 ppm.

* * * * *